United States Patent
Wittenstein et al.

(10) Patent No.: US 10,038,709 B1
(45) Date of Patent: Jul. 31, 2018

(54) COMPUTER NETWORK DEFENSE SYSTEM EMPLOYING MULTIPLAYER GAMING FUNCTIONALITY

(71) Applicant: EMC IP Holding Company LLC, Hopkinton, MA (US)

(72) Inventors: Andreas Wittenstein, Granada (ES); Damon Cokenias, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 282 days.

(21) Appl. No.: 14/870,529

(22) Filed: Sep. 30, 2015

(51) Int. Cl.
*G06F 11/00* (2006.01)
*H04L 29/06* (2006.01)

(52) U.S. Cl.
CPC .......... *H04L 63/1425* (2013.01); *H04L 63/20* (2013.01)

(58) Field of Classification Search
CPC .... G06F 21/566; H04L 63/20; H04L 63/1425
USPC .......................................................... 726/4
See application file for complete search history.

(56) References Cited

U.S. PATENT DOCUMENTS

| | | | |
|---|---|---|---|
| 2005/0216957 A1* | 9/2005 | Banzhof | H04L 63/02 726/25 |
| 2010/0161541 A1* | 6/2010 | Covannon | G06F 17/30032 706/47 |
| 2015/0106813 A1* | 4/2015 | Mihalocivi | H04L 47/125 718/1 |

* cited by examiner

Primary Examiner — Kambiz Zand
Assistant Examiner — Aubrey Wyszynski
(74) Attorney, Agent, or Firm — BainwoodHuang

(57) ABSTRACT

A computerized network defense system includes a user interface component for displaying an interactive landscape to an agent, including a graphical representation of (1) network components and interconnections within a computer network, (2) activity within the computer network, and (3) threat information associated with the activity. The activity and threat information is presented in visual association with corresponding network components and interconnections. Agent interaction with the landscape includes (a) selectively highlighting specific network components or interconnections, specific activity, and specific threat information represented on the interactive landscape, (b) causing additional more detailed information about a highlighted item to be displayed in a display element separate from the multidimensional graphical representation (e.g., pop-up box), and (c) selecting and directing use of remediation tools for remediation actions to counteract threat-associated activity. A remediation component initiates the remediation actions based on the agent's selecting and directing use of the remediation tools.

20 Claims, 8 Drawing Sheets

COMPUTER NETWORK DEFENSE SYSTEM EMPLOYING MULTIPLAYER GAMING FUNCTIONALITY

SUMMARY

The invention is related to computer network defense systems.

Internal and external threats to computer networks have grown into a large global problem. With so much of modern electronics being networked and hackable, there is increasing online crime: international syndicates rob banks and shops; corporations and states plunder secrets and sabotage operations.

Current defenses of networks averaging millions of clicks a minute and millions of visitors a day are grossly inadequate against million-strong botnets and dedicated professional hacking teams. Existing network defense user interfaces use graphical presentation mostly for charts of overall statistics, and rely on scrolling lists of texts for detailed information, necessarily limited to the speed of reading. They are thus simply not up to the task of dealing with onslaughts of the magnitude and speed today's networks face. Network defense agents, faced with the tedium and inadequacy of existing user interfaces, feel unrewarded and unchallenged, resulting in a high turnover rate. By analogy, today's text-centric network defense systems are comparable to the text-based role-playing games of the 1970s.

Meanwhile, the computer gaming industry has leapt generations ahead, with massively multiplayer online role-playing games commandeering the world's leading supercomputers to simulate highly dynamic immersive virtual worlds in which numerous geographically dispersed players strive through their avatars. It might be valuable if network defense systems could incorporate aspects of modern computer gaming. However, the virtual-world metaphor of computer games is difficult to apply directly to network defense because of the vast topological difference between hyper-connected networks and the physical environment. It is easy to imagine links between webpages as roads between towns; but whereas roads on earth are largely restricted to two dimensions, webpages are by design interconnected to minimize the number of clicks from any page to any page, so that even a modest website of a few hundred pages effectively has tens of thousands of roads travelling through hundreds of dimensions—never mind a large e-commerce site (e.g., amazon.com) with thousands of pages added each day.

A disclosed network defense system increases efficacy and productivity of network defense agents by providing a highly interactive real-time and historical network-traffic exploratory user interface. Comprehensible bandwidth is vastly increased by aspects such as exploiting intuitive visuals over text; providing a clear overview of network nodes, node hierarchies, connections, and traffic; visually contrasting current foreground activity against normal background activity; depicting actors as individually recognizable avatars moving along network connections; clearly displaying the type, magnitude, and severity of all actants; providing banks of selectors to rapidly hone in on interesting activity; making novel attacks instantly recognizable as new avatar species; making rule-writing for defense automation trivial; encouraging teamwork with collaborative campaigns; facilitating communication with seamless handoffs; promoting agent training by encouraging exploration through a compelling interactive interface; and promoting agent retention with a participatory, competitive, rewarding, and even addictive game-style user interface.

In one particular respect, a computerized network defense system for monitoring and protecting a computer network includes interface circuitry coupling the computerized network defense system to the computer network and to an intelligent agent for receiving input therefrom and providing output thereto; one or more processors operative to execute computer program instructions; and memory coupled to the interface circuitry and to the processors. The memory stores computer program instructions executed by the processors to realize a collection of functional components including:

a user interface component operative to display an interactive landscape to the agent and to enable agent interaction therewith, the interactive landscape including a multidimensional graphical representation of (1) network components and interconnections within the computer network, (2) activity within the computer network, and (3) threat information associated with the activity within the computer network, the activity and threat information being presented in visual association with corresponding network components and interconnections to which the activity and threat information pertain, the agent interaction including (a) selectively highlighting specific network components or interconnections, specific activity, and specific threat information represented on the interactive landscape, (b) causing additional more detailed information about a highlighted item to be displayed in a display element separate from the multidimensional graphical representation, and (c) selecting and directing use of remediation tools for corresponding remediation actions to counteract threat-associated activity; and a remediation component operative to initiate the remediation actions in the network based on the agent's selecting and directing use of the remediation tools.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

The disclosed technique borrows online-gaming concepts to increase network defense efficacy and efficiency by vastly increasing comprehensible bandwidth, and training and retaining teams of skilled agents with compelling, competitive, rewarding, and addictive fun. Networks are portrayed as immersive virtual worlds via loopable real-time and historical views of actors such as users' avatars traversing connections through landscapes such as website page hierarchy, server & service network, and Internet geography, their routes depicted against a background of normal traffic. Actants (avatars, nodes, and arcs) may display threats audio-visually as segments hued & patterned by type, sized by magnitude, and intensified by severity. Projecting hyperdimensional networks such as page-linkage into 2- or 3-dimensional viewable space necessitates separating arcs, nodes, and labels into distinct regions, as in chord diagrams or similar landscapes, to avoid mutual obliteration. In a chord diagram implementation, concentric rings show collapsible node hierarchy. Hovering over any element gives instant details; clicking hides all unrelated elements. Banks of selectors for characteristics such as threat type, magnitude, and severity tame the flood, revealing swarms of namable individual threat-combination species represented by editable avatars. Agents choose and customize namable weapons to fight avatar species, collaborate on campaigns by voice, and are scored by and rewarded for their effectiveness. Rules for automatous defense can be automatically generated from successful selection-plus-weapon combinations.

Embodiments

Figure 1:
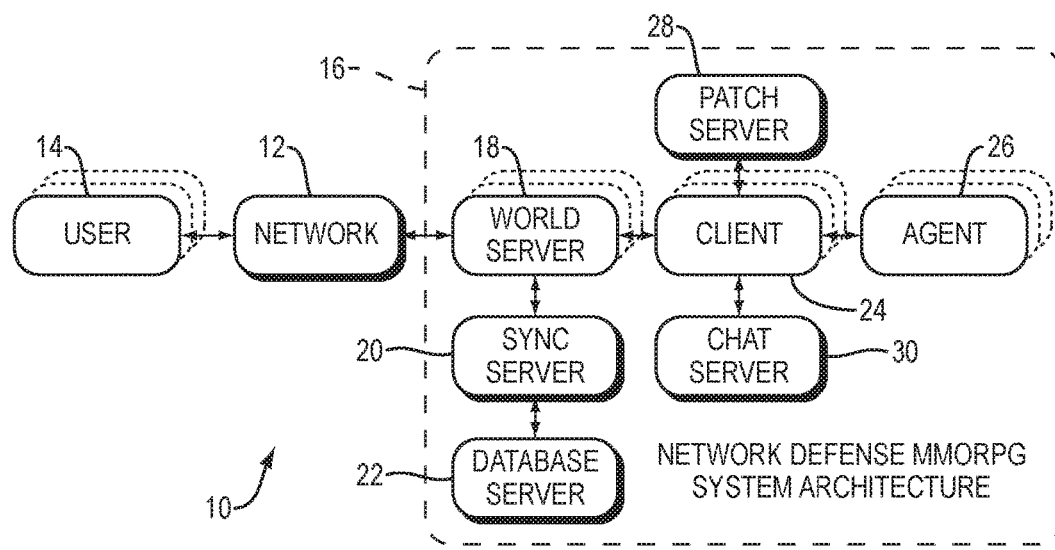
FIG. 1 is a block diagram of a computer system including a network defense system.

FIG. 1 shows a computer system 10 including a network 12 accessed by users 14, along with a network defense system 16 labelled "Network Defense MMORPG System Architecture". The acronym MMORPG refers to Massively Multiplayer Online Role Playing Game. This refers to a multi-agent, online gaming aspect to the network defense system 16, as described more below. The network defense system 16 includes one or more world servers 18, an optional synch server 20, a database server 22, and one or more client machines or "clients" 24 associated with corresponding users referred to as "agents" 26. It may also include a patch server 28 and chat server 30.

In the present context the network 12 represents a protected computing system being monitored for and protected against malicious user and software activity, generally referred to as "threats". Thus the network 12 includes not only typical network devices such as access points, routers, gateways, etc., but more generally includes server computers, client computers, storage systems, and all the software executing thereon. In one example utilized herein, the network 12 includes a large web site, i.e., a collection of computers and storage systems storing and providing access to a collection of linked hypertext documents or "pages" along with other documents, media files, etc., which are collectively referred to as "resources". The network 12 provides interfaces by which the users 14 may discover and access these resources. There may be a variety of types of users 14 and types of access, which may be resource-specific.

It is assumed that the network 12 also includes monitoring and logging functionality (such as a STEM as described below) capable of capturing a variety of operational data, which is provided to the network defense system 16 for its use as described herein. This data includes data describing the structure and utilization of network resources. Referring to the web site example, the data includes data describing each web page (e.g., a name, URL, modification date, etc.), other resources (e.g., names and other metadata of media files, etc.), links among the pages and other resources, and the access/utilization of the network resources by the users 14. Such access/utilization data may describe communication exchanges or sessions including the participants, timing, resources accessed, etc.

The network defense system 16 uses the above data from the network 12 to build and maintain a model of the network 12 that provides underlying structure for network defense operations. Model data is stored in a database provided by database server 22. The synch server 20 supports synchronization of model views and other operating state across multiple clients 24, including different clients 24 of a single agent 26 (e.g., a desktop device and a mobile device), as well as different agents using a single client. The world server 18 includes the modeling functionality, and it provides streamed and stored data to the clients 24 for their use in operations as described more below. The patch server 28 is used by system administrators to distribute patches, updates, new revisions, etc. of operating software to the clients 24. The chat server 30 provides for text-based and audiovisual real-time communications among the clients 24.

Consistent with standard MMORPG terminology, the world server 18 serves the information needed by the clients 24 to render a virtual world for respective agents 26, and it communicates any changes made to that virtual world by the agents 26 back to the database (via the synch server 20). In an ordinary MMORPG, actions in the virtual world of a game have no correspondence with actions in the real world. However, in the disclosed technique, the virtual world is an idealized but true representation of a real world, i.e., the network 12 being defended, and the actions of the virtual agents result in corresponding real actions in the real world, i.e., changes/actions in the network 12.

Regarding the interface between the world server 18 and network 12, the world server 18 (1) receives and filters information-feeds and logs from the network 12 as well as fetching archived network information and assets from the database (through the synch server 20) and transmits this information as (predicted to be) needed to a client 24; (2) receives actions from the client 24 and transmits them back to the network 12; and (3) receives edited assets from the client 24 and transmits them (through the synch server 20) back to the database. In one embodiment the network 12 includes a so-called STEM system (security information and event monitoring) with specialized functionality for collecting logs, serving as a centralized point for security actions to be taken, etc. The client 24 may also provide the user interface to such STEM system.

As described more below, the disclosed technique employs certain user interface constructs referred to as "landscapes". In general, a world server 18 knows what landscapes its respective clients 24 are using, so that it can filter out unnecessary information in its feeds to such clients 24. When there are too many clients 24 for one world server 18 to handle, and especially if different clients 24 are employing different landscapes, then it can be advantageous to align world servers 18 with landscapes, and have a synch server 20 coordinate between world servers 18 serving different landscapes. Also, for a remote defense agent, the communication bandwidth between world server 18 and client 24 may prohibit the world server 18 from feeding the client 24 the data required to render all landscapes; but for a local client defending a small network with little traffic, much or all of the data filtering could be done by the client.

Figure 2:
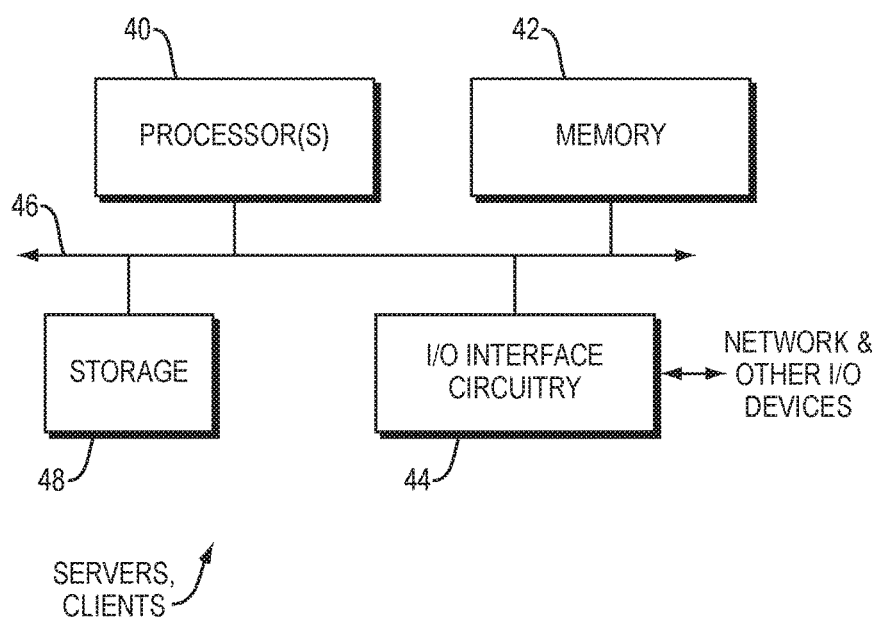
FIG. 2 is a block diagram of a computer from a hardware perspective.

FIG. 2 shows an example configuration of a physical computer such as a server or client from a computer hardware perspective. The hardware includes one or more processors 40, memory 42, and interface circuitry 44 interconnected by data interconnections 46 such as one or more high-speed data buses. The interface circuitry 44 provides a hardware connection to an external network and/or other external devices/connections (EXT DEVs). The processor(s) 40 with connected memory 42 may also be referred to as "processing circuitry" herein. There may also be local storage 48 such as a local-attached disk drive or Flash drive. In operation, the memory 42 stores data and instructions of system software (e.g., operating system) and one or more application programs which are executed by the processor(s) 40 to cause the hardware to function in a software-defined manner. Thus the computer hardware executing instructions of a network defense application, for example, can be referred to as a network defense circuit or network defense component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
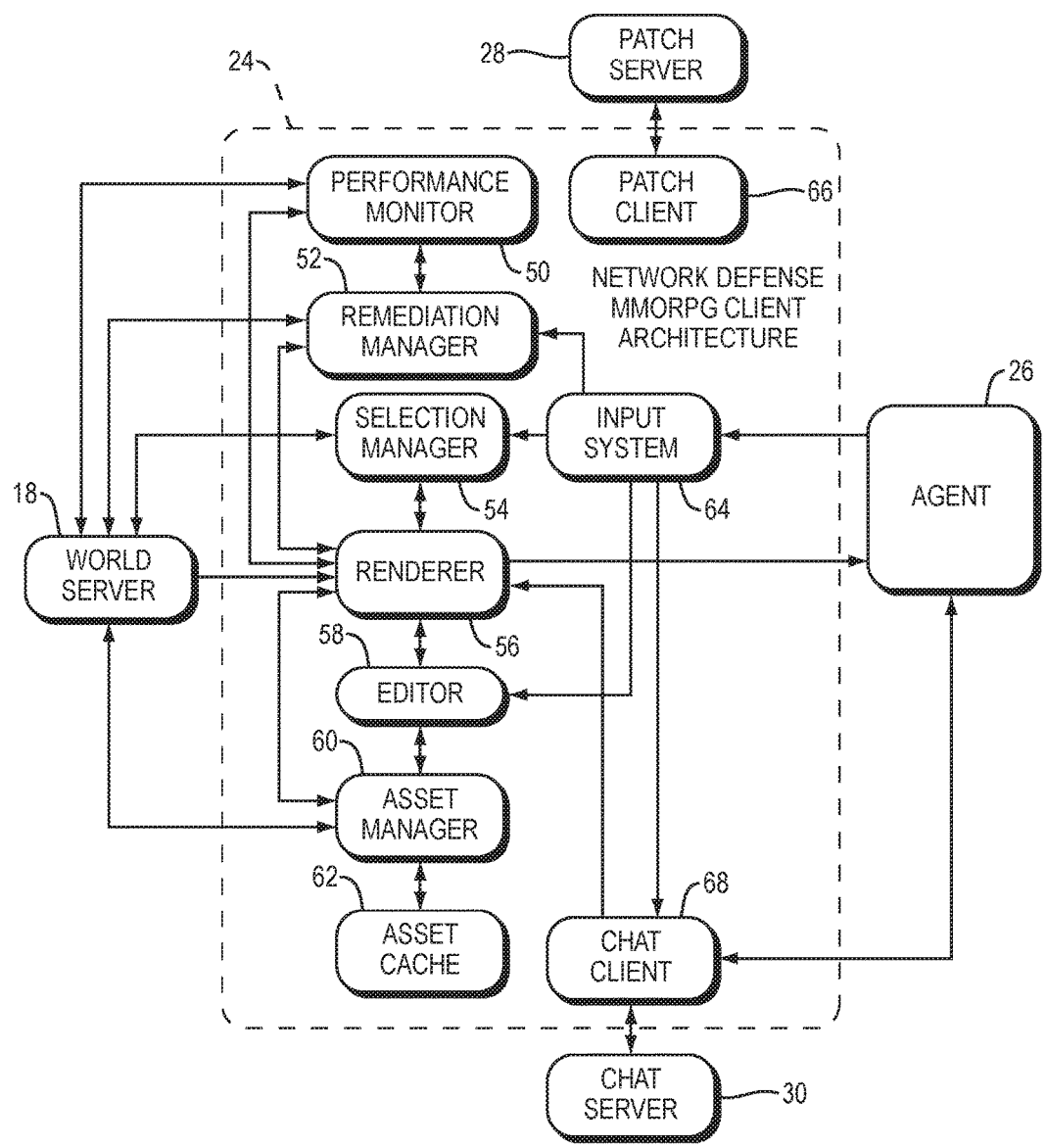
FIG. 3 is a block diagram of a network defense system client.

FIG. 3 shows the client 24, labelled as Network Defense MMORPG Client Architecture, in more detail. Its functional components include a performance monitor 50, remediation manager 52, selection manager 54, renderer 56, editor 58, asset manager 60, asset cache 62, input system 64, patch client 66 and chat client 68. These are described briefly in turn below.

The asset manager 60 manages the ingestion, annotation, cataloguing, storage, retrieval, updating, and exportation of game-related digital assets. Techniques for digital asset management are generally known. The assess cache 62 is a cache for digital assets received from the world server 18.

The renderer 56 plays a primary role as a user interface component in displaying a representation of the model from world server 18 to the agent 26 as well as results of agent interaction therewith via an input system 64 and a selection manager 54. Generally, the representation is a virtual environment referred to herein as a "landscape". In some embodiments, the landscape may mimic a physical landscape such as a virtual geographic region, data center, etc. In other cases the landscape may be more schematic. One example described below employs a so-called "chord diagram" having a certain structure with outward radial lines representing resources such as web pages, an interior mesh of arc representing user traversal of links among web pages, and concentric bands or rings conveying information about threats and risks associated with the resources and traversals.

The remediation manager 52 responds to agent input to initiate remediation actions in the network 12 via the world server 18. Examples of remediation actions are described below.

The editor 58 is used by an agent 26 to create and manage various items forming parts of the interactive landscape. In one example, graphical icons referred to as "avatars" may be used to represent users, potential threats, etc. in the landscape depicted by the renderer 56. An agent 26 can create and edit such avatars using the editor 58. A host of other items may be the subject of editing, as explained further below.

The performance monitor 50 monitors activities of the agent 26 to provide performance feedback that adds to a game-like feel of the agent's interaction with the system. For example, the performance monitor 50 may maintain tallies of threats that an agent 26 has identified, time spent by an agent 26 investigating a potential threat, the utilization and effectiveness of remediation actions initiated by the agent 26, etc., on the basis of which it may bestow awards for mastering the detection and remediation of threat types and other proficiency-level achievements, represented for example as badge segments or appendages in the agent's avatar, or as weapons in the agent's personal arsenal. It also may participate, via the world server 18, in a mechanism for comparing performance among different agents 26, which can impart training and competitive aspects to agents' experience with the system, such as a leaderboard displaying competitors' scores and ranks.

The patch client 66 and chat client 68 provide local client functionality for interacting with the patch server 28 and chat server 30 for patch/update and inter-agent communication functionality, respectively.

Figure 4:
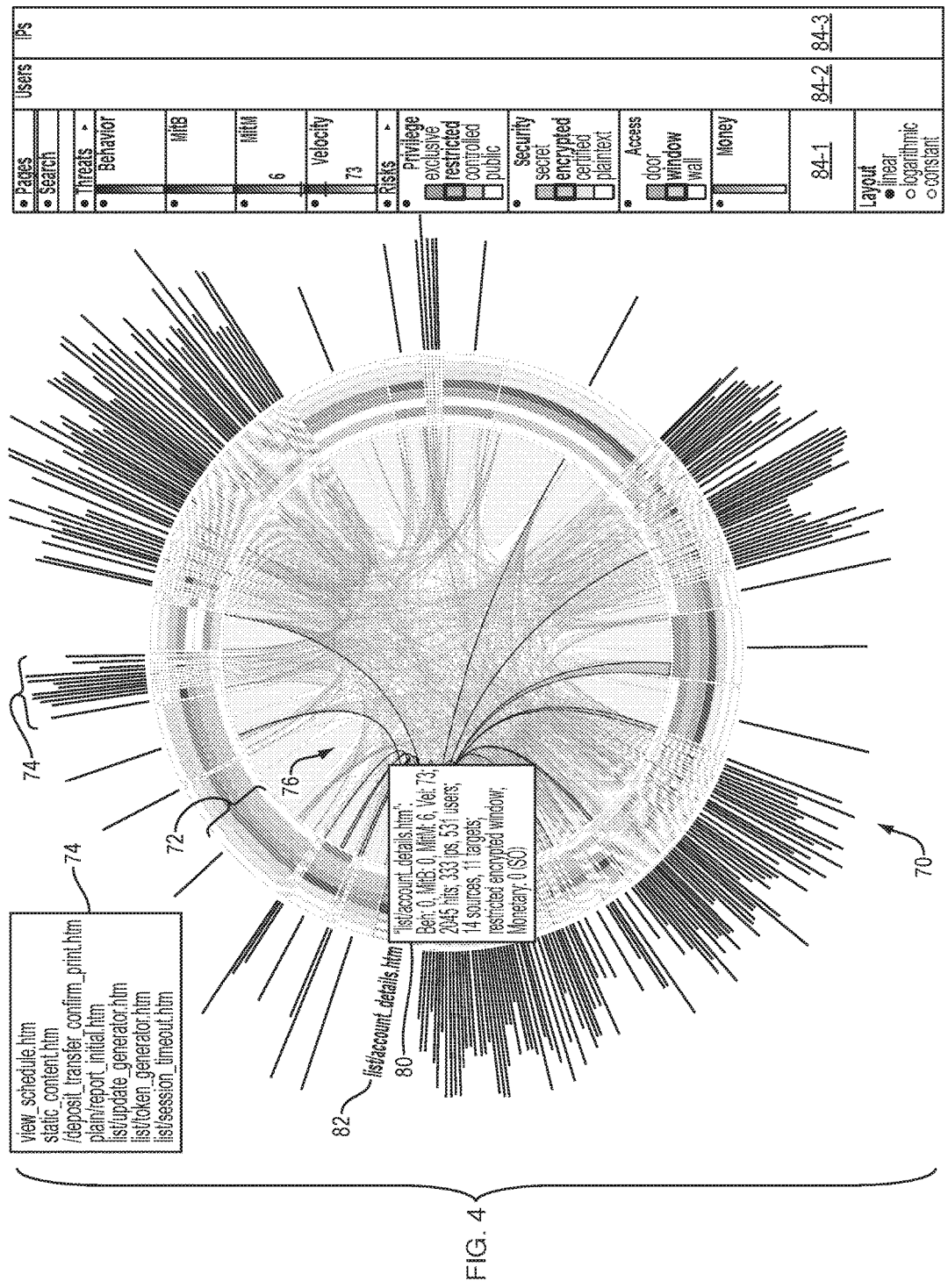
FIGS. 4, 5 and 6 are diagrams of a graphical landscape presented in a user interface.
Figure 5:
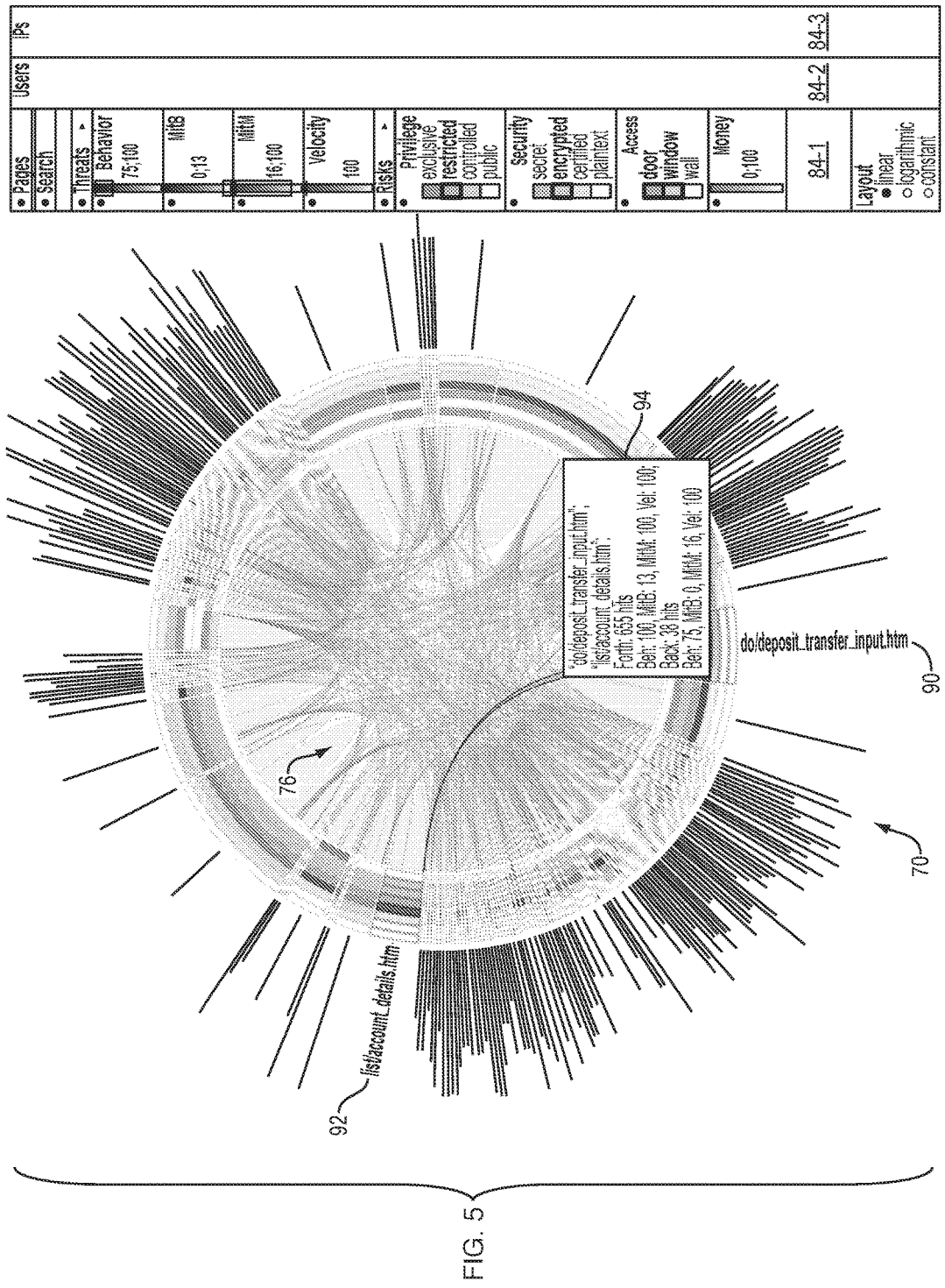
Figure 6:
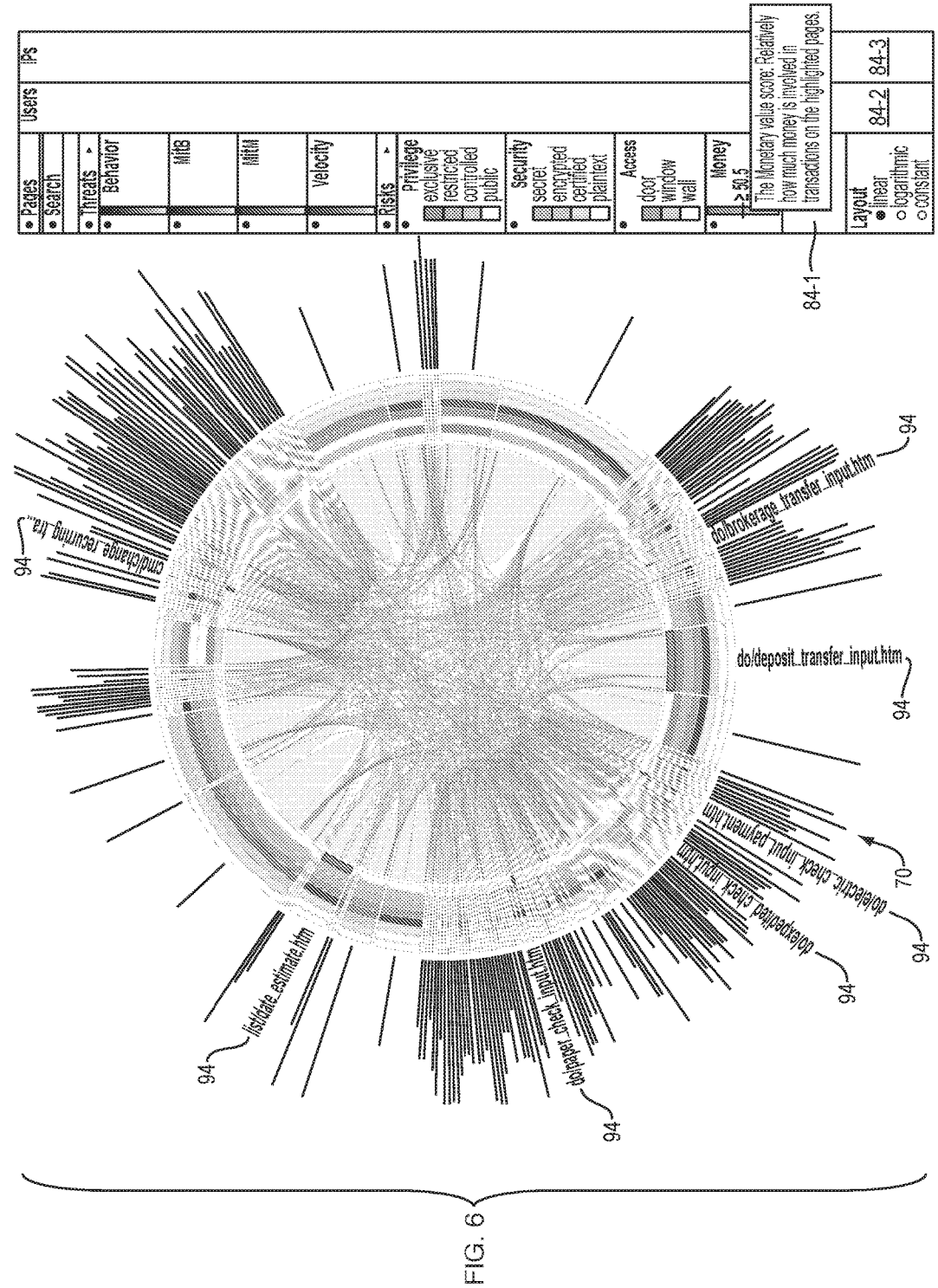

FIGS. 4, 5 and 6 are depictions of an example interactive landscape 70 displayed to an agent 26 by renderer 56 on a suitable graphics display, using model data from the world server 18 as well as agent input via the input system 64 and selection manager 54 (FIG. 3).

The landscape 70 has data organized according to multiple readily appreciated dimensions. A set of concentric rings 72 employ color and other graphical indicators to convey information about potential threats and risks as explained more below. Outside of the rings 72 are radially arranged labels 74 of resources (e.g., web pages). These are arranged around the outside of the rings 72 according to some scheme, such as alphabetical order or location in a hierarchical label space. A page is allocated angular space according to relative usage ("hits") or some other measure, and is thus represented as a set of concentric segments. A page hierarchy may be represented by grouping them with supersegments in further exterior rings (not shown), where an outermost unbroken ring would represent the root of the hierarchy. Inside of the rings 72 is a set of arcs 76 interconnecting the labels 74. The arcs 76 represent instances of one or more users transitioning from one ("source") page to another ("target") page, typically by clicking on a link in the source page.

One feature shown in FIG. 4 is a pop-up box 80 that contains information for a specific page whose label 82 or one of whose segments has been selected. In one embodiment, this level of selection might be made by simply "hovering" a pointer over the label 82; in other embodiments some additional action such as right-clicking might be required. A foreground/background paradigm may be used to visually separate a selected page 82 from the other (non-selected) pages 74. In the illustrated example this is provided by relative weighting or saturation of the text font and segment borders, i.e., relatively blacker for selected and relatively whiter (grayer) for non-selected.

In the illustrated example, the pop-up box 80 displays the following information:

Page name (Label), e.g., "/list/account-details.html . . . "

Values for "selectors", shown as Behavior (Beh) etc. and described more below

Number of "hits" or accesses, and number of distinct users and IP addresses accessing Number of sources (pages linked from) and targets (pages linked to)

Additional information regarding threat or risk as explained below

Also displayed along with the landscape 70 are one or more interactive graphical widgets referred to as "selectors" 84. The particular example of FIGS. 4 and 5 shows details of a "Pages" (web pages) bank of selectors 84-1. Other examples include a "Users" selector-bank 84-2 and "IPs" (IP addresses) selector-bank 84-3, which are not shown in detail in this example. A given embodiment may employ any number of selectors 84, which serve as interactive keys into the landscape 70 as well as mini display regions for information.

In the illustrated embodiment, the Pages selector-bank 84-1 has eight distinct selectors, each associated with a respective ring 72. These are grouped into two classes of page selectors: Threats and Risks. The upper four selectors show types of Threats associated with the pages, which in this case are identified as Behavior (Beh), Man in the Browser (MitB), Man in the Middle (MitM), and Velocity (Vel). The Threats shown here employ a quantitative paradigm indicating the degree of implication of the page (or other actant) in threats of that type. The lower four selectors show types of risks associated with the pages, in this case Privilege (for privilege-based access), Security (for data security such as encryption), Access, and Money. Three of the Risks shown here employ a categorial paradigm indicating discrete level of that risk associated with the page (or other actant). For example, the Access indicator depicted distinguishes three levels of risk: "wall", providing no access to personal or proprietary information; "window", providing read access to personal or proprietary information; and "door" providing read/write access to such information. The Money indicator represents exposure of financial assets, such as contents of bank accounts, etc.

A selector group or selector bank may be provided with a pop-up menu control, here depicted as a rightward-pointing triangle, permitting selecting or deselecting which selectors, and thereby which corresponding rings in the landscape, to display. Individual selectors may be provided with disclosure controls, here depicted as round buttons, which may be used to minimize or maximize (as shown) the height of the widget, or to close the widget and thereby remove the corresponding threat ring (or other locus) from the landscape. Likewise, a disclosure control on a selector group or selector bank may minimize the corresponding group or bank of selectors, thereby merging the group or bank of selectors into a single selector displaying and controlling the maximum or average value of the merged selectors, and similarly merging the corresponding rings in the landscape into a single ring.

A selector 84 can be used for both display and control by the agent, or, as an indicator, just for display. In the example of FIG. 4, the agent's selection of a particular page 82 causes each non-zero selector in bank 84-1 to display an indicator of the exact value for the corresponding data item. Thus the Velocity indicator shows a mark at about the three-quarters point of a slider along with the text "73" indicating the actual value on a scale of 100. This is the same value shown in the pop-up box 80 for this item. In the categorial selectors, a specific selected value is highlighted, such as "restricted" under Privilege. The value of a selector is visually represented by a graphical dimension such as color saturation, as shown here, corresponding to the same graphical dimension in the respective landscape ring 72. In the examples shown here, for selector values from 0 (bottom) to 100 (top), the color saturation goes from zero to full. Also, the rings 72 themselves may have different levels of saturation in different regions according to the values for the corresponding pages. This is depicted in the Velocity ring, for example, which is fourth from the outside. It has relatively darker and lighter areas, corresponding to different values for the Velocity item for the pages in these areas. This feature helps an agent 26 easily identify particularly active or risky areas that might merit closer scrutiny. Another good example in FIG. 4 is the Money indication, carried by the innermost ring 72. If an agent 26 is particularly concerned about exposure of financial assets, the display immediately identifies two areas of pages (at about 6:00 and 10:00 positions) of relatively higher Money risk.

FIG. 5 shows another aspect of use of the landscape 70, namely an agent hovering over or otherwise selecting an arc 76. In this case, pages 90 and 92 that are the source and target for the selected arc are highlighted, and a pop-up box 94 presents information about the transitions. In particular, it identifies by label the two endpoint pages along with information for transitions in a first direction from the first page 90 to the second 92 (shown as "Forth") as well as for transitions in the opposite direction (shown as "Back"). Note that in this case where the information for the two pages 90 and 92 differs, the Pages selectors 84-1 show both values and indicate a range for the quantitative selectors, rather than the single-value indicators that appear in FIG. 4.

FIG. 6 shows an example use of a selector 84 as a control. As a control, a selector 84 enables an agent 26 to specify areas and ranges of values of interest, and the rendering of the landscape 70 can be adjusted to identify those resources satisfying the agent's criteria. In the example of FIG. 6, an agent 26 selects a particular location on the slider for Money, and the renderer 56 reacts by highlighting the labels 94 of those pages having equal or higher Money values (50.5 or higher in this example). Selection might be made by hovering, moving a slider bar, etc. Different combinations can be specified by making selections in multiple areas. This is a powerful technique for narrowing the scope of a task/investigation. To control use of screen area, individual areas of a selector bank 84 might be collapsible. In the illustrated example a dark button at upper left in each area functions as a collapse control. Of course, entire selectors 84 may also be selectively collapsible, placeable and/or removable from the display.

FIGS. 4-6 represent page traffic accumulated over some interesting time frame, without displaying individual avatars or their movements. Another aspect to analysis is time progression of activity, and some embodiments will incorporate a representation of time. In one example, time may be represented by an interactive timeline calibrated with standard units of time ranging from microseconds through minutes, hours, days, weeks, and months to years, as appropriate for the adjustable time scale, and displaying a succession of thumbnail images of the landscape 70 at respective times, with a capability of replaying a sequence of such landscape images as a movie at an appropriately compressed (e.g. for visualizing ATPs) or expanded (e.g. for visualizing high-speed trading irregularities) timescale for the agent 26 to be able to find events of interest and perceive patterns of interest (e.g., within a range of seconds or tens of seconds). Such replaying may include facilities for scrubbing, looping, fast forward and reverse, tweening, jumping, and freeze-frame. A visual representation of time along a z-axis (in/out of the plane of the display) may be used, similar to a technique used in the Time Machine® backup tool by Apple Computer. The length of the time frame of interest may be adjustable by the agent, as may the length of the time window represented by each image, as well as the playback duration. In another example, the movie includes the avatars of selected users or types of users and shows their movement along the arcs from node to node, highlighting their spoors (e.g. with more prominent hues) over the background traffic. For perceptual continuity, their movement may be time-warped, relatively slowed along the arcs by relatively shortening their sojourns at the nodes. To clarify the passage of time, their spoors may fade with time.

Online Gaming Aspect

As mentioned, beyond the mere display of information and selection-type user interaction described above, the network defense system 16 may incorporate gaming-like aspects to enhance user experience and effectiveness. Although a landscape such as the example landscape 70 of FIGS. 4 and 5 may be used, alternative embodiments may employ more of a virtual-world type of landscape more analogous to those of MMORPGs. If the defense system is used in connection with a far-flung IT infrastructure, for example, then it may employ one or more geographical levels (e.g., world/country maps) and possible deeper levels or alternative logical views as appropriate. Additionally it will generally incorporate greater agent interactivity as well as mechanisms for enabling multiple agents 26 to collaborate and/or compete with each other. Regarding interactivity, one particular aspect may be the use of avatars or similar live icons representing actual or potential threats. Avatars may be segmented in some manner, like the segmented pages in FIGS. 4 through 6, to convey different dimensions of data, e.g., threat and risk dimensions such as conveyed by the rings 72 in FIGS. 4 through 6, with the data represented by shading, color, patterns, appendages or other useful indicators. Segmentation is an advantageous way to visually convey multiple independent pieces of information in an avatar snaking along a path, particularly when immersed in a crowd of other avatars moving along their respective paths. Commonly co-occurring or otherwise related segments may also be combined into a single "tagma" for quicker recognizability and compactness. The segments and tagmas in an avatar may be arranged in a canonical order to aid quick recognition of avatars representing similar threat constellations; or, to highlight the evolution of a threat, the segments may be added as the avatar acquires them through various stages of threatening behavior. Other attributes including sound attributes may be used, bringing in an audio dimension to the information and agent interaction.

Figure 7:
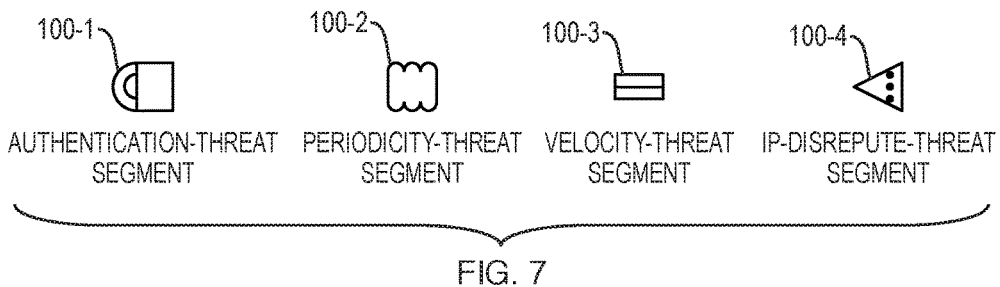
FIGS. 7, 8, 9, and 10 are diagrams of an avatar and its components presented in a user interface.

FIGS. 7-10 show examples of avatars and their construction. In particular, a multi-segment avatar is shown that provides information about different types or aspects of threats. FIG. 7 shows four distinct segment icons 100-1 through 100-4 for respective aspects of threats as follows:

| | | |
|---|---|---|
| 100-1 | Lock | Authentication-threat |
| 100-2 | Periodic squiggles | Periodicity-threat |
| 100-3 | Longitudinal bars | Velocity-threat |
| 100-4 | Dotted triangle | IP-disrepute-threat |

Figure 8:
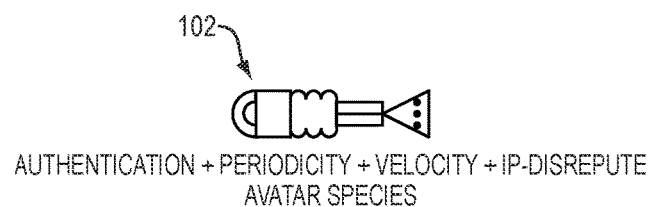

FIG. 8 shows the arrangements of segments 100 into a multi-segment avatar "species" 102 including all four segments 100 from FIG. 7. This is a generic representation used to show the basic structure; examples are given below in which the segments carry particular threat values.

Figure 9:
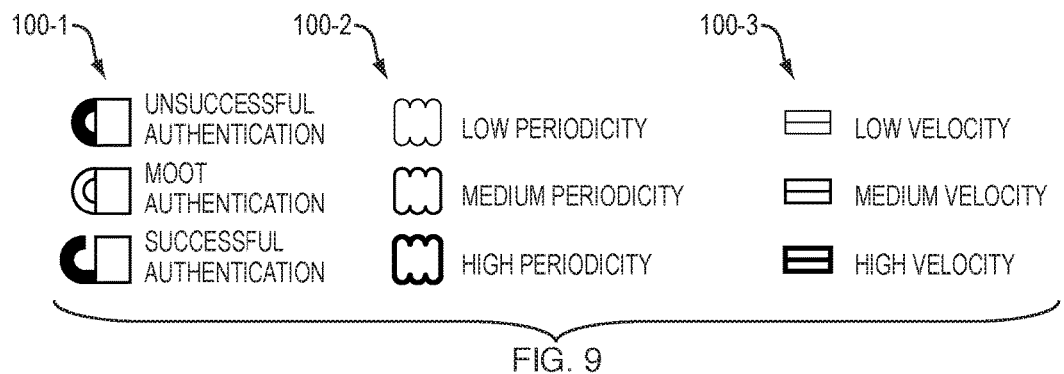

FIG. 9 illustrates a scheme for alternative ways of rendering the segments 100 to convey value information about the respective threat. With respect to the authentication-threat segment 100-1, representing a categorial variable, three depictions are shown for unsuccessful (dark hasp, closed), moot (light hasp, closed) and successful (dark hasp, open) authentication. For both the periodicity-threat segment 100-2 and velocity-threat segment 100-3, which represent quantitative variables, successively heavier lines are used to convey values in a range from low to high.

Figure 10:
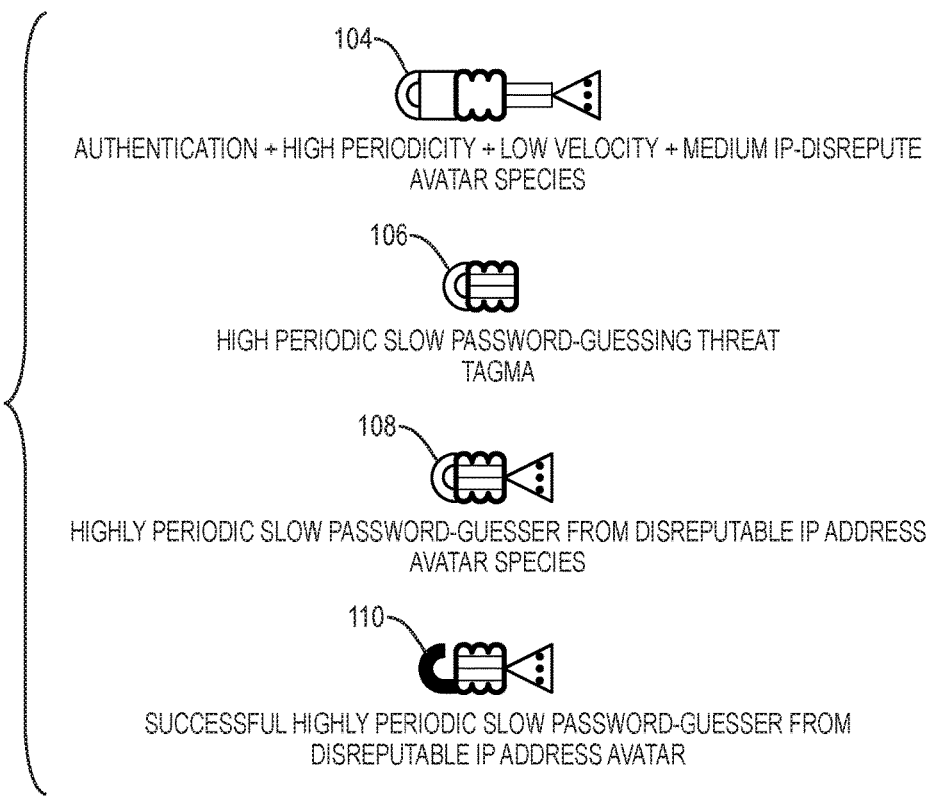

FIG. 10 presents an example of an avatar species representing a common subspecies of the avatar species in FIG. 7, utilizing the variations shown in FIG. 9 and demonstrating how a commonly co-occurring set of segments—in this case, slow periodic password guessing common in APTs—may be combined into a single tagma that is more quickly recognizable and compact than the sequence of separate segments:

104 Avatar species representing a combination of authentication, High periodicity, low velocity, and medium IP-disrepute threats

106 A single tagma representing the common combination of high periodicity, low velocity, and medium IP-disrepute

108 The avatar species in 104 substituting tagma 106 for the combination of segments 100-1*b*, 100-2*c*, and 100-3*a*.

110 The avatar species in 108 after successfully guessing a password.

Figure 11:
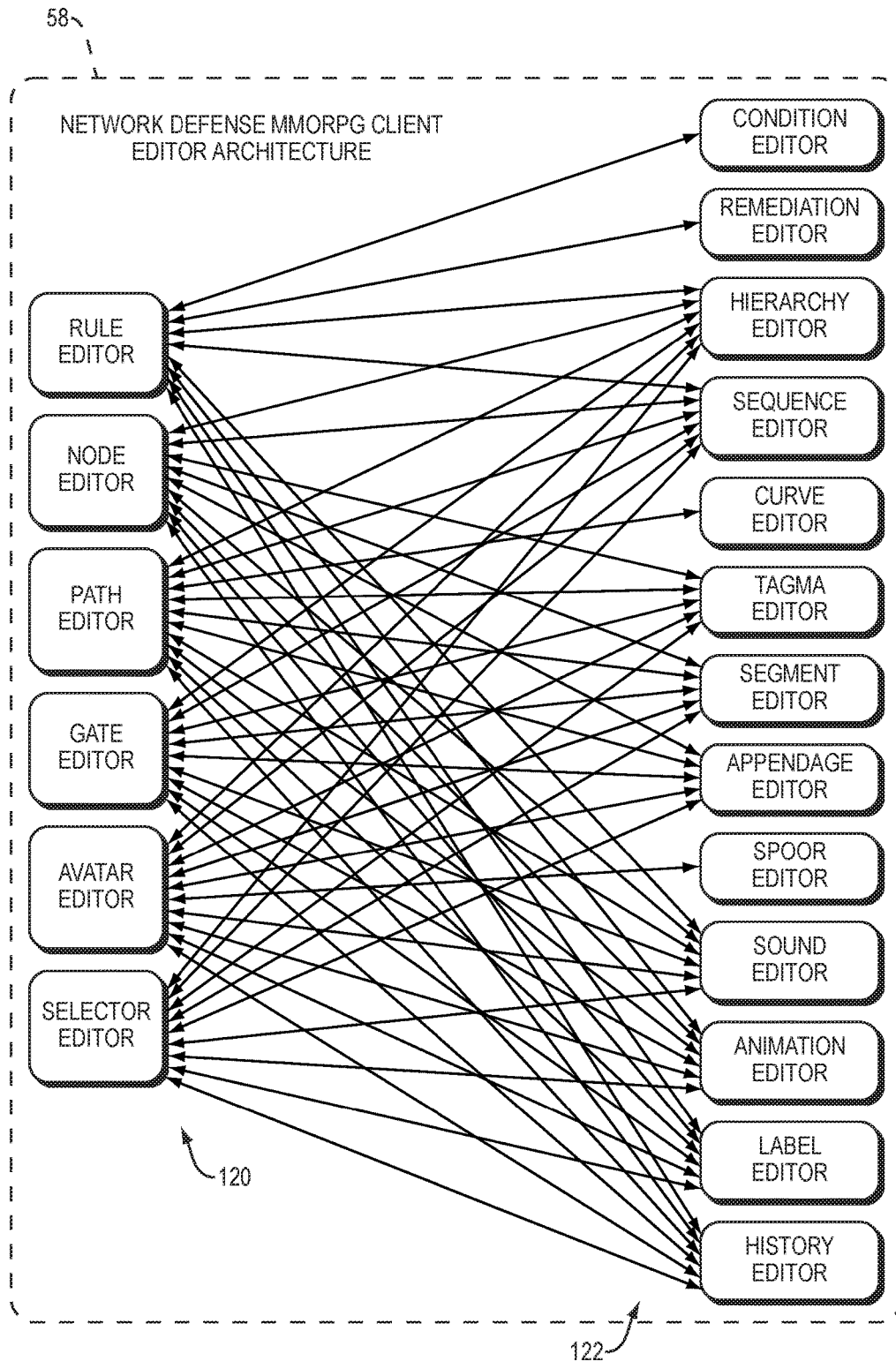
FIG. 11 is a block diagram of an editor.

FIG. 11 shows an organization for the editor 58 used by the agents 26 to customize various aspects of the interactive network defense application, in particular the virtual-world and gaming-analog aspects. On the left are editors 120 for "actants", i.e., higher-level components that integrate activity such as avatars, paths, nodes etc. On the right are editors 122 for lower-level aspects of the actants. These include editors for segments, appendages, spoors etc. of avatars or other components, editors for sound, animation and sequence, and editors for history and relationships such as hierarchy.

As mentioned, an implementation having gaming-inspired aspects may utilize alternative landscapes. Generally the landscape will include aspects of a graph, i.e., nodes and connections. The landscape 70, for example, has nodes representing web pages and connections representing link traversals. Nodes and connections may represent different types of real components of the network 12 depending on its structure and the types of activity and threats. In this respect, example nodes include the following:

computers
 services
 business functions
 geoterritories
 IP addresses, and the connections among such nodes would represent appropriate relationships or associations. For business functions, for example, connections might represent the flow from step to step of a multi-function process or activity, or some other type of association that may be relevant in some way.

As also mentioned, the gaming aspect will generally include remediation actions, which can be viewed from a gaming perspective as "weapons" or tools that an agent 26 (participant) can select and utilize to achieve a goal (e.g., destruction, quarantining or otherwise thwarting a threat activity). Example remediation actions include the following:

blocking
 delaying
 throttling
 disarming
 diverting
 sandboxing
 disinforming
 monitoring
 warning
 prosecuting
 counterattacking As also mentioned, any of a variety of selectors 84 might be employed. These could be drawn from the following list, which are organized by category:

1. Actants
  users agents
IP addresses
ports
domains
URIs
geolocations
computers
applications
protocols
transport layers
botnets
proxy pools
relay networks
2. Threats
signature-based
behavioral
reputational
3. Risks
monetary
reputations
access levels
privilege levels
security levels
services
4. Time
foreground interval
background interval
looping speed The combination of a particular set of selector settings with a successful application of a weapon is equivalent to the combination of the condition and action of a rule. Thus this invention makes the writing of network-defense rules—ordinarily an error-prone activity requiring very advanced knowledge and skills—trivial. Thus the disclosed invention can be used to augment or replace the user interface for writing and editing rules for use in a rules engine.

While various embodiments of the invention have been particularly shown and described, it will be understood by those skilled in the art that various changes in form and details may be made therein without departing from the spirit and scope of the invention as defined by the appended claims.

What is claimed is:

1. A computerized network defense system for monitoring and protecting a computer network, comprising:
   interface circuitry coupling the computerized network defense system to the computer network and to an intelligent agent for receiving input therefrom and providing output thereto;
   one or more processors operative to execute computer program instructions; and
   memory coupled to the interface circuitry and to the processors, the memory storing computer program instructions executed by the processors to realize a collection of functional components including:
      a user interface component operative to display an interactive landscape to the agent and to enable agent interaction therewith, the interactive landscape including a multidimensional graphical representation of (1) network components and interconnections within the computer network, (2) activity within the computer network, and (3) threat information associated with the activity within the computer network, the activity and threat information being presented in visual association with corresponding network components and interconnections to which the activity and threat information pertain, the agent interaction including (a) selectively highlighting specific network components or interconnections, specific activity, and specific threat information represented on the interactive landscape, (b) causing additional more detailed information about a highlighted item to be displayed in a display element separate from the multidimensional graphical representation, and (c) selecting and directing use of remediation tools for corresponding remediation actions to counteract threat-associated activity; and
      a remediation component operative to initiate the remediation actions in the network based on the agent's selecting and directing use of the remediation tools.

2. The computerized network defense system of claim 1, wherein the interactive landscape includes:
   a set of concentric rings employing respective colors to convey the activity and threat information;
   labels of the network components extending radially outside the set of concentric rings; and
   a set of arcs within the set of concentric rings, the arcs connecting respective ones of the labels representing interconnections between the corresponding network components in the computer network.

3. The computerized network defense system of claim 2, wherein (1) the network components include hypertext pages of a web site stored in the computer network, and the labels include names of the web pages in a namespace of the web site, and (2) the arcs represent instances of web site users navigating from source to target web pages by activation of links therebetween.

4. The computerized network defense system of claim 2, wherein the labels are arranged around the outside of the set of concentric rings according to a scheme selected from alphabetical ordering and ordering according to a hierarchical structure of the network components.

5. The computerized network defense system of claim 1, wherein the agent interaction includes agent-initiated display of a pop-up box containing the more detailed information for a network component or interconnection whose representation on the landscape is selected by the agent.

6. The computerized network defense system of claim 1, wherein displaying the interactive landscape includes use of a foreground/background paradigm to visually separate an agent-selected representation of a network component or interconnection from non-selected network components or interconnections.

7. The computerized network defense system of claim 1, wherein displaying the interactive landscape includes displaying selectors for corresponding threats and risks, the threats assigned to corresponding activities in the network, the risks assigned to corresponding network components in the network, the selectors being interactive graphical widgets providing either or both a display function and a control function, the display function displaying a particular actual value for a threat or risk associated with an agent-selected representation of a network component or interconnection in the landscape, the control function enabling the agent to selectively highlight the representations of network components or interconnections associated with a range of values for a threat or risk specified by the agent using the control function.

8. The computerized network defense system of claim 7, wherein the threats of the selectors are selected from threat types including one or more of Behavior, Man in the Browser, Man in the Middle, and Velocity, and wherein the risks of the selectors are selected from risk types including one or more of Access Privilege, Data Security, Access Type, and Financial.

9. The computerized network defense system of claim 1, wherein displaying the interactive landscape includes displaying a time progression of network activity over a period corresponding to duration of a given threat, the time progression being displayed in time-condensed form enabling the agent to detect a slow-acting threat having a duration of one week or greater.

10. The computerized network defense system of claim 1, wherein the user interface component is further operative to incorporate online gaming aspects to the display and agent interaction with the interactive landscape, the online gaming aspects including (1) a multiple-level, virtual-world aspect to the interactive landscape, (2) display and agent manipulation of avatars and other iconic representations of actants in the network, and (3) performance monitoring for tracking and rating agent effectiveness in identifying and resolving threats using the computerized network defense system.

11. A non-transitory computer-readable medium storing computer program instructions, the instructions being executable by a set of one or more computers to cause the computers to operate as a computerized network defense system for monitoring and protecting a computer network, by:
    displaying an interactive landscape to an agent and enabling agent interaction therewith, the interactive landscape including a multidimensional graphical representation of (1) network components and interconnections within the computer network, (2) activity within the computer network, and (3) threat information associated with the activity within the computer network, the activity and threat information being presented in visual association with corresponding network components and interconnections to which the activity and threat information pertain, the agent interaction including (a) selectively highlighting specific network components or interconnections, specific activity, and specific threat information represented on the interactive landscape, (b) causing additional more detailed information about a highlighted item to be displayed in a display element separate from the multidimensional graphical representation, and (c) selecting and directing use of remediation tools for corresponding remediation actions to counteract threat-associated activity; and
    initiating remediation actions in the network based on the agent's selecting and directing use of the remediation tools.

12. The non-transitory computer-readable medium of claim 11, wherein the interactive landscape includes:
    a set of concentric rings employing respective colors to convey the activity and threat information;
    labels of the network components extending radially outside the set of concentric rings; and
    a set of arcs within the set of concentric rings, the arcs connecting respective ones of the labels representing interconnections between the corresponding network components in the computer network.

13. The non-transitory computer-readable medium of claim 12, wherein (1) the network components include hypertext pages of a web site stored in the computer network, and the labels include names of the web pages in a namespace of the web site, and (2) the arcs represent instances of web site users navigating from source to target web pages by activation of links therebetween.

14. The non-transitory computer-readable medium of claim 12, wherein the labels are arranged around the outside of the set of concentric rings according to a scheme selected from alphabetical ordering and ordering according to a hierarchical structure of the network components.

15. The non-transitory computer-readable medium of claim 11, wherein the agent interaction includes agent-initiated display of a pop-up box containing the more detailed information for a network component or interconnection whose representation on the landscape is selected by the agent.

16. The non-transitory computer-readable medium of claim 11, wherein displaying the interactive landscape includes use of a foreground/background paradigm to visually separate an agent-selected representation of a network component or interconnection from non-selected network components or interconnections.

17. The non-transitory computer-readable medium of claim 11, wherein displaying the interactive landscape includes displaying selectors for corresponding threats and risks, the threats assigned to corresponding activities in the network, the risks assigned to corresponding network components in the network, the selectors being interactive graphical widgets providing either or both a display function and a control function, the display function displaying a particular actual value for a threat or risk associated with an agent-selected representation of a network component or interconnection in the landscape, the control function enabling the agent to selectively highlight the representations of network components or interconnections associated with a range of values for a threat or risk specified by the agent using the control function.

18. The non-transitory computer-readable medium of claim 17, wherein the threats of the selectors are selected from threat types including one or more of Behavior, Man in the Browser, Man in the Middle, and Velocity, and wherein the risks of the selectors are selected from risk types including one or more of Access Privilege, Data Security, Access Type, and Financial.

19. The non-transitory computer-readable medium of claim 11, wherein displaying the interactive landscape includes displaying a time progression of network activity over a period corresponding to duration of a given threat, the time progression being displayed in time-condensed form enabling the agent to detect a slow-acting threat having a duration of one week or greater.

20. The non-transitory computer-readable medium of claim 11, wherein the user interface component is further operative to incorporate online gaming aspects to the display and agent interaction with the interactive landscape, the online gaming aspects including (1) a multiple-level, virtual-world aspect to the interactive landscape, (2) display and agent manipulation of avatars and other iconic representations of actants in the network, and (3) performance monitoring for tracking and rating agent effectiveness in identifying and resolving threats using the computerized network defense system.

* * * * *